US012448254B2

(12) United States Patent
Fukushima et al.

(10) Patent No.: US 12,448,254 B2
(45) Date of Patent: Oct. 21, 2025

(54) OVERHEAD TRANSPORT VEHICLE, AND METHOD OF CONTROLLING RAISING/LOWERING OF GRIPPING UNIT

(71) Applicant: Murata Machinery, Ltd., Kyoto (JP)

(72) Inventors: Chiaki Fukushima, Inuyama (JP); Futoshi Watabe, Inuyama (JP)

(73) Assignee: Murata Machinery, Ltd., Kyoto (JP)

(*) Notice: Subject to any disclaimer, the term of this patent is extended or adjusted under 35 U.S.C. 154(b) by 423 days.

(21) Appl. No.: 18/008,216

(22) PCT Filed: Mar. 23, 2021

(86) PCT No.: PCT/JP2021/011988
§ 371 (c)(1),
(2) Date: Dec. 5, 2022

(87) PCT Pub. No.: WO2021/250976
PCT Pub. Date: Dec. 16, 2021

(65) Prior Publication Data
US 2023/0202806 A1 Jun. 29, 2023

(30) Foreign Application Priority Data
Jun. 8, 2020 (JP) ................................ 2020-099275

(51) Int. Cl.
*B66C 13/06* (2006.01)
*B66C 13/22* (2006.01)
*B66C 13/48* (2006.01)

(52) U.S. Cl.
CPC ............ *B66C 13/063* (2013.01); *B66C 13/22* (2013.01); *B66C 13/48* (2013.01)

(58) Field of Classification Search
CPC ....... B66C 13/063; B66C 13/22; B66C 13/48; H01L 21/67733; H01L 21/67736; H01L 21/6773
See application file for complete search history.

(56) References Cited

U.S. PATENT DOCUMENTS 5,924,582 A 7/1999 Miyata et al.
2011/0262004 A1* 10/2011 Murakami .............. B66C 13/48 382/103
(Continued)

FOREIGN PATENT DOCUMENTS

JP 4-201988 7/1992
JP 10-167663 6/1998
(Continued)

OTHER PUBLICATIONS

English translation of the International Preliminary Report on Patentability and Written Opinion dated Dec. 22, 2022, of counterpart PCT International Application No. PCT/JP2021/011988.
(Continued)

*Primary Examiner* — Anna M Momper
*Assistant Examiner* — Nathaniel L Adams
(74) *Attorney, Agent, or Firm* — DLA Piper LLP (US)

(57) ABSTRACT

An overhead transport vehicle includes a gripping unit to grip an article, an suspension unit by which the gripping unit is suspended, a drive unit that reels up the suspension unit to thereby raise the gripping unit, a detection unit to detect swing of the gripping unit, and a controller that controls the drive unit to reel up the suspension unit and store the gripping unit into the transport vehicle body. In reel-up control to reel up the suspension unit, when swing of the gripping unit exceeds a predetermined width, the controller stops reeling up the suspension unit, maintains the gripping unit at a standby position lower than a storage position, and then, reels up the suspension unit when the swing of the gripping unit becomes equal to or less than the predetermined width.

5 Claims, 12 Drawing Sheets

(56) References Cited

U.S. PATENT DOCUMENTS

| | | | | |
|---|---|---|---|---|
| 2015/0203333 | A1* | 7/2015 | Ota | B66C 13/18 212/276 |
| 2020/0118853 | A1* | 4/2020 | Harasaki | B66C 13/48 |

FOREIGN PATENT DOCUMENTS

| | | | | |
|---|---|---|---|---|
| JP | 3086645 | B2 | * | 9/2000 |
| JP | 2004-018196 | | | 1/2004 |
| JP | 2004018196 | A | * | 1/2004 |
| JP | 2004-67297 | | | 3/2004 |
| JP | 2005-067772 | | | 3/2005 |
| JP | 2008-280149 | | | 11/2008 |
| JP | 2010-024025 | | | 2/2010 |
| JP | 2010-24026 | | | 2/2010 |
| WO | 2014/017222 | | | 1/2014 |

OTHER PUBLICATIONS

International Search Report dated May 25, 2021, of corresponding International Application PCT/2021/011988, along with an English translation.

Written Opinion dated Apr. 14, 2025, from counterpart Singapore Patent Application No. 11202260922Q.

* cited by examiner

OVERHEAD TRANSPORT VEHICLE, AND METHOD OF CONTROLLING RAISING/LOWERING OF GRIPPING UNIT

TECHNICAL FIELD

This disclosure relates to an overhead transport vehicle and a method of controlling a raising/lowering of a gripping unit in the overhead transport vehicle.

BACKGROUND

In an overhead transport vehicle, a gripping unit to grip an article is raised/lowered in a state of being suspended by the transport vehicle. The gripping unit descends toward a placement section such as a load port to grip an article. After gripping the article, the gripping unit rises together with the article. When the gripping unit rises, swing of the gripping unit may occur. Japanese Unexamined Patent Application Publication No. 2005-67772 considers swing damping when an elevating platform is reeled up.

In the overhead transport vehicle, when swing of a gripping unit is large, for example, swing-related abnormality is announced and raising/lowering of the gripping unit is stopped. In response to a stop of raising/lowering of the gripping unit, a worker needs to manually restore operations of the overhead transport vehicle including raising/lowering of the gripping unit. If the overhead transport vehicle traveling on a rail is stopped due to swing-related abnormality, the rail may be jammed, causing a traffic jam.

It could therefore be helpful to provide an overhead transport vehicle capable of automatically restoring operations of the overhead transport vehicle including a raising/lowering of the gripping unit and a method of controlling a raising/lowering of the gripping unit even when swing of the gripping unit occurs.

SUMMARY

We thus provide an overhead transport vehicle that includes a gripping unit to grip an article, a suspension unit to suspend the gripping unit, a drive unit configured to reel out the suspension unit to thereby lower the gripping unit and to reel up the suspension unit to thereby raise the gripping unit, a transport vehicle body to which the suspension unit and the drive unit are attached, a detection unit to detect swing of the gripping unit, and a controller configured to control the drive unit to reel up the suspension unit and store the gripping unit into the transport vehicle body. In reel-up control to reel up the suspension unit, when swing of the gripping unit detected by the detection unit exceeds a predetermined width, the controller stops reeling up the suspension unit, maintains the gripping unit at a standby position lower than a storage position at which the gripping unit is stored into the transport vehicle body and then, when swing of the gripping unit becomes equal to or less than the predetermined width, the controller reels up the suspension unit.

The controller controls the drive unit to reel out or reel up the suspension unit so that the gripping unit descends or rises. Since the gripping unit descends or rises in a state of being suspended by the suspension unit, swing can occur. This "swing" means that the suspension unit swings in any direction to form an angle on the basis of a state in which the suspension unit extends in a vertical direction. When the swing of the gripping unit exceeds the predetermined width, the controller stops a reel-up of the suspension unit to maintain the gripping unit at a standby position lower than a storage position. Then, when the swing of the gripping unit becomes equal to or less than the predetermined width, the controller reels up the suspension unit. As just described, the gripping unit is maintained at the standby position until the swing of the gripping unit becomes equal to or less than the predetermined width, and at the time the swing becomes equal to or less than the predetermined width, a reel-up is restarted. Therefore, even when the swing of the gripping unit occurs, operations of the overhead transport vehicle including a raising/lowering of the gripping unit can be automatically restored.

The predetermined width may be set to be larger than tolerance of the swing of the gripping unit and/or the article permitted when the gripping unit is stored into the transport vehicle body. The predetermined width, which is a standard for judging whether the gripping unit is maintained or not at a standby position, is set to be larger than swing tolerance when the gripping unit is stored. This control causes the gripping unit to wait at the standby position until a relatively large swing is converged a bit, and reel-up is restarted once the swing falls within the predetermined width. The restart of reel-up shortens length (reel-out amount) of the suspension unit. We found that the shorter the suspension unit is, the shorter the time until swing subsides becomes. The swing can be converged earlier as a whole by restarting reel-up quickly than by waiting at the standby position until the swing reaches the tolerance.

In a reel-up control to reel up the suspension unit, when a first swing waiting control to maintain the gripping unit at the standby position is performed at least once, the controller may stop reeling up the suspension unit for a certain period of time at the time when the gripping unit reaches a convergence position between the standby position and the storage position and may perform a second swing waiting control to maintain the gripping unit at the convergence position. The second swing waiting control is performed by the controller at the convergence position, thus swing can surely subside before the gripping unit is stored into the transport vehicle body.

A second reel-up speed in a reel-up control to move from the convergence position to the storage position may be slower than a first reel-up speed in reel-up control to move to the convergence position. Taking a lot of time to reel up from the convergence position to the storage position can make remaining swing smaller effectively.

The swing of the gripping unit is detected by the detection unit in a reel-out control in which the controller controls the drive unit to reel out the suspension unit. When the swing of the gripping unit exceeds the predetermined width, the controller stops reel-out of the suspension unit, and then, when the swing of the gripping unit becomes equal to or less than the predetermined width, the controller may reel up the suspension unit and maintain the gripping unit at the convergence position lower than the storage position. The swing can be converged more quickly as a whole by this control than by waiting for the convergence of the swing at a position where the swing exceeding the predetermined width is first detected.

We also provide a method of controlling a raising/lowering of a gripping unit in the overhead transport vehicle including the gripping unit to grip an article, a suspension unit by which the gripping unit is suspended, a drive unit configured to lower the gripping unit by reeling out the suspension unit and to raise the gripping unit by reeling up the suspension unit, a transport vehicle body to which the suspension unit and the drive unit are attached, and a detection unit to detect the swing of the gripping unit. In a reel-up control to reel up the suspension unit, the method of controlling the raising/lowering of the gripping unit includes a detection process to detect the swing of the gripping unit by the detection unit, and a reel-up process to stop reeling up the suspension unit, maintain the gripping unit at the standby position lower than the storage position at which the gripping unit is stored in the transport vehicle body when the swing of the gripping unit exceeds the predetermined width, and then reel up the suspension unit when the swing of the gripping unit becomes equal to or less than the predetermined width.

According to the method of controlling the raising/lowering of the gripping unit, as with the above, the gripping unit is maintained at the standby position until the swing of the gripping unit becomes equal to or less than a predetermined width and reel-up is restarted once the swing becomes equal to or less than the predetermined width. Therefore, even when the swing of the gripping unit occurs, operations of the overhead transport vehicle including raising/lowering of the gripping unit can be automatically restored.

In a reel-up control to reel up the gripping unit, when the first swing waiting control to maintain the gripping unit at the standby position is performed in the reel-up process at least once, reel-up of the gripping unit may be stopped for a certain period of time at the time when the gripping unit reaches a convergence position between the standby position and the storage position, and the second swing waiting control to maintain the gripping unit at the convergence position may be performed. The second swing waiting control at the convergence position is performed so that the swing can surely be converged before the gripping unit is stored into the transport vehicle body.

Operations of an overhead transport vehicle including raising/lowering of a gripping unit can thus be automatically restored even when the swing of the gripping unit occurs.

REFERENCE SIGNS LIST

Figure 1:
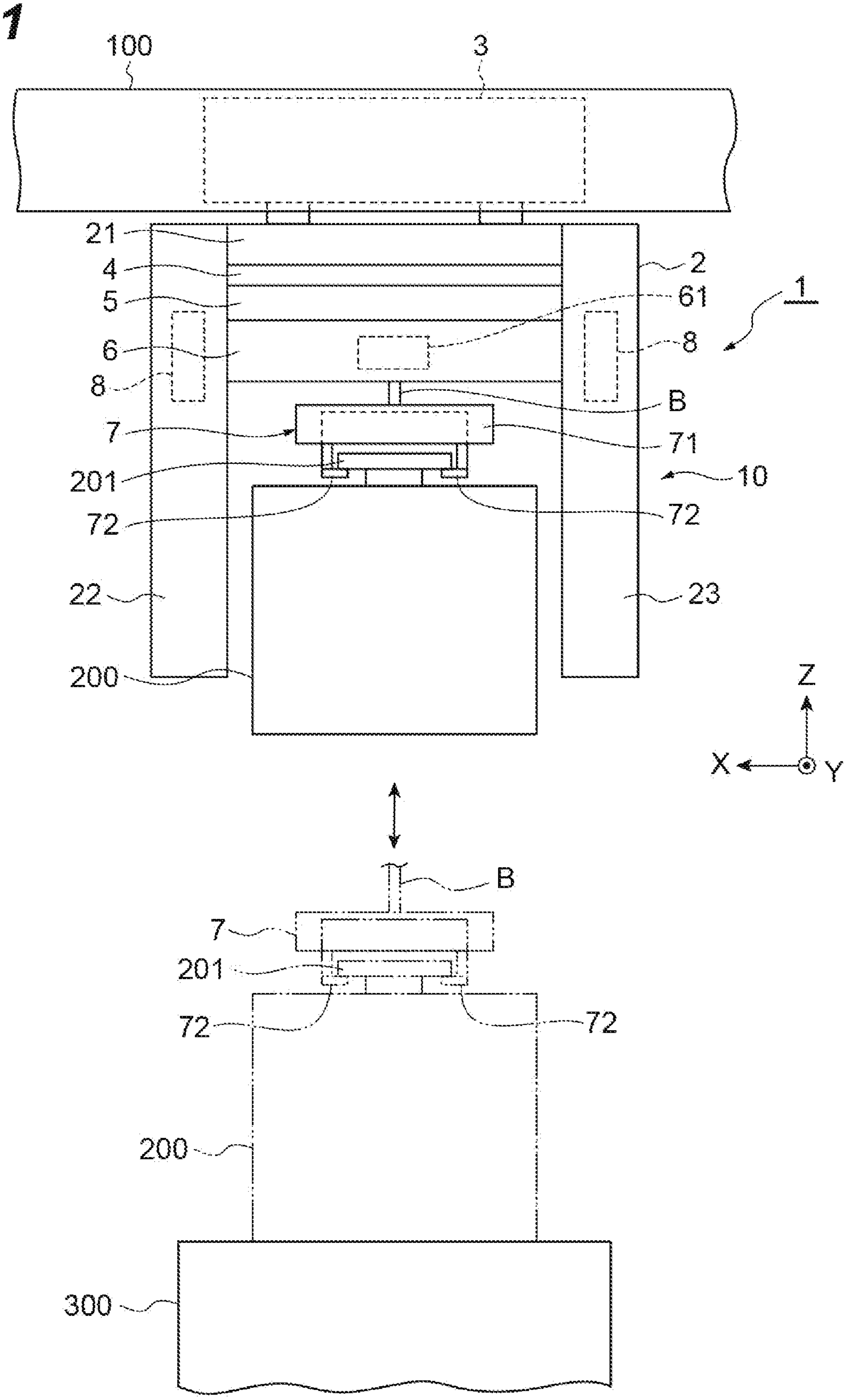
FIG. 1 is a view illustrating a schematic configuration of an overhead transport vehicle according to an example.

1 Overhead transport vehicle
2 Frame unit
6 Elevating drive unit
7 Holding unit (gripping unit)
10 Transport vehicle body
61 Elevating motor (drive unit)
67 Detection unit
200 FOUP (article)
300 Load port (placement section)
B Belt (suspension unit)
P1 Standby position
P2 Convergence position
P3 Storage position
S Storage space

DETAILED DESCRIPTION

As illustrated in FIG. 1, an overhead transport vehicle 1 of an example travels along a rail 100 provided near a ceiling of a clean room in which semiconductor devices are produced. The overhead transport vehicle 1 of an example transports FOUP (Front Opening Unified Pod) (article) 200 in which a plurality of semiconductor wafers are accommodated and transfers the FOUP 200 from/to a load port (placement section) 300 provided at a processing device that performs various processing on semiconductor wafers. The rail 100 is suspended from a ceiling.

The overhead transport vehicle 1 is provided with a frame unit 2, a travel unit (travel portion) 3, a lateral unit 4, a theta unit 5, an elevating drive unit 6, a holding unit (gripping unit) 7, a belt (suspension unit) B, and a controller 8. The frame unit 2 has a center frame 21, a front frame 22, and a rear frame 23. The front frame 22 extends downwards from an end portion of front side (front side in a traveling direction of the overhead transport vehicle 1) of the center frame 21. The rear frame 23 extends downwards from an end portion of rear side (rear side in a traveling direction of the overhead transport vehicle 1) of the center frame 21.

The travel unit 3 is arranged above the center frame 21. The travel unit 3 travels along the rail 100, for example, by receiving power supply in a non-contact manner from a high-frequency current line laid along a rail 100. The lateral unit 4 is arranged below the center frame 21. The lateral unit 4 moves the theta unit 5, the elevating drive unit 6, and holding unit 7 laterally (side direction in a traveling direction of the overhead transport vehicle 1). The theta unit 5 is arranged below the lateral unit 4. The theta unit 5 rotates the elevating drive unit 6 and the holding unit 7 in a horizontal plane.

The holding unit 7 grips a flange part 201 of a FOUP 200 placed on a load port 300. The holding unit 7 includes a base 71 and a pair of grippers 72. The pair of grippers 72 is supported by the base 71 to be openable or closable in a horizontal direction. The pair of grippers 72 is opened or closed by a drive motor (not illustrated) and a link mechanism (not illustrated). In this example, when the pair of grippers 72, 72 is opened, a height position of the holding unit 7 is adjusted such that holding surfaces of the grippers

72 become lower than a height of bottom surface of the flange part 201. Then, the pair of grippers 72, 72 is closed in this state so that the holding surfaces of the grippers 72 are located below the bottom surface of the flange part 201. In this state, the elevating drive unit 6 is raised so that the flange part 201 is held (gripped) by the pair of grippers 72, 72 and the FOUP 200 is supported.

The elevating drive unit 6 is arranged below the theta unit 5. The elevating drive unit 6 raises or lowers the holding unit 7. The holding unit 7 is arranged below the elevating drive unit 6. The holding unit 7 is suspended by, for example, four belts B attached to the elevating drive unit 6. The elevating drive unit 6 has an elevating motor (drive unit) 61 fixed to therein. The elevating motor 61 lowers the holding unit 7 by reeling out the belts B. The elevating motor 61 raises the holding unit 7 by reeling up belts B. Also, the holding unit 7 may be supported by three belts B.

Figure 2:
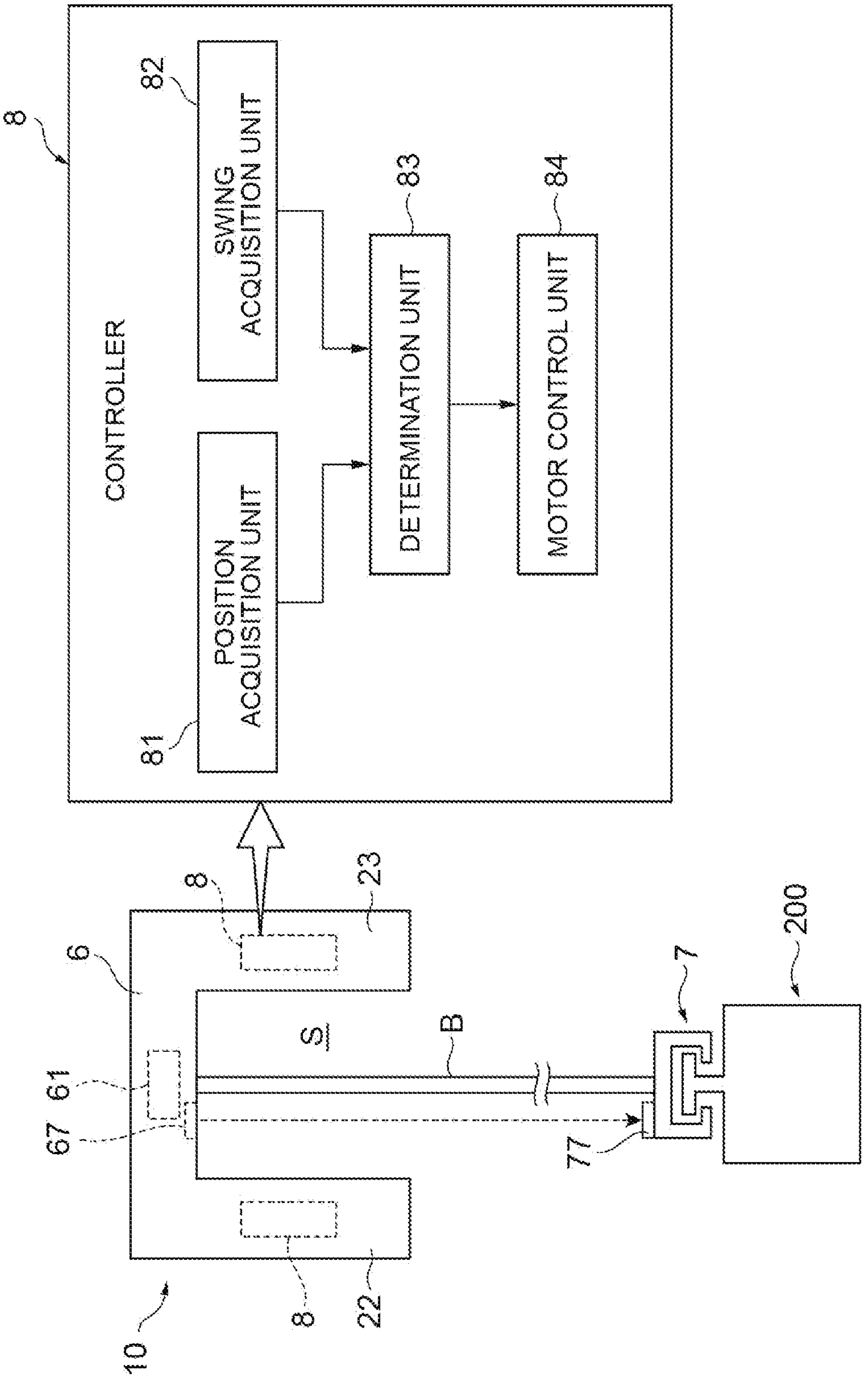
FIG. 2 is a view illustrating a schematic configuration of a detection unit and a controller in the overhead transport vehicle of FIG. 1.

The overhead transport vehicle 1 includes a transport vehicle body 10 to store the holding unit 7 and the FOUP 200 when the FOUP 200 is transported. The transport vehicle body 10 includes, for example, the frame unit 2, the lateral unit 4, the theta unit 5, the elevating drive unit 6, and the belt B. In other words, the belt B and the elevating motor 61 of the elevating drive unit 6 are attached to the transport vehicle body 10. As illustrated in FIG. 2, a storage space S that stores the holding unit 7 and the FOUP 200 is formed in the transport vehicle body 10. The storage space S is defined mainly by the front frame 22, the rear frame 23, covers 24, 25 (see FIG. 4(*b*)) to cover the holding unit 7 in a lateral direction. For example, the whole of the holding unit 7 is stored in the storage space S. The whole of the FOUP 200 or only upper part of the FOUP 200 may be stored in the storage space S.

The controllers 8 are disposed in, for example, the front frame 22 and the rear frame 23. The controller 8 controls the elevating motor 61 to reel out the belt B to thereby lower the holding unit 7 onto the load port 300. The controller 8 controls the elevating motor 61 to reel up the belt B to raise the holding unit 7 to thereby store it into the transport vehicle body 10. The controller 8 controls the elevating motor 61 to thereby raise or lower the holding unit 7 above the FOUP 200 (above the load port 300). In response to a receipt of rotation-related signals from the elevating motor 61, the controller 8 can detect reel-out amount of the belt B (length of belt). The controller 8 can detect a position (height) of the holding unit 7 based on the reel-out amount of the belt B (length of belt). The controller 8 is an electronic control unit including CPU (processor), ROM and RAM. The controller 8 is configured or programmed to control each part of the overhead transport vehicle 1.

The overhead transport vehicle 1 with the above configuration, as one example, operates as follows. When the FOUP 200 is transferred from the load port 300 to the overhead transport vehicle 1, the overhead transport vehicle 1, which is not holding the FOUP 200, stops above the load port 300. When a horizontal position of the holding unit 7 is deviated from a position just above the load port 300, a horizontal position and angle of the elevating drive unit 6 and the holding unit are finely adjusted by driving the lateral unit 4 and the theta unit 5. Then, the elevating drive unit 6 lowers the holding unit 7 and the holding unit 7 holds the flange part 201 of the FOUP 200 placed on the load port 300. The elevating drive unit 6 raises the holding unit 7 to upward end and place the FOUP 200 between the front frame 22 and the rear frame 23. Then, the overhead transport vehicle 1 holding the FOUP 200 starts traveling.

On the other hand, when the FOUP 200 is transferred from the overhead transport vehicle 1 to the load port 300, the overhead transport vehicle 1 holding the FOUP 200 stops above the load port 300. When a horizontal position of the holding unit 7 (FOUP 200) is deviated from a position just above the load port 300, a horizontal position and angle of the elevating drive unit 6 and the holding unit are finely adjusted by driving the lateral unit 4 and the theta unit 5. Then, the elevating drive unit 6 lowers the holding unit 7 and the holding unit 7 places the FOUP 200 onto the load port 300, and releases its hold on the flange part 201 of the FOUP 200. The elevating drive unit 6 raises the holding unit 7 to an upward end. Then, the overhead transport vehicle 1 not holding the FOUP 200 starts traveling.

The overhead transport vehicle 1 of this example is provided with a control mechanism to converge swing of the holding unit 7 when the holding unit 7 rises or descends, that is, the belt B is reeled up or reeled out. When the holding unit 7 holds the FOUP 200, the control mechanism included in the overhead transport vehicle 1 converges swing of the holding unit 7 and the FOUP 200 and causes the holding unit 7 (and the FOUP 200) to be stored into the transport vehicle body 10 within a limited time. Further, even when a width of swing of the holding unit 7 (and the FOUP 200) is equal to or more than a predetermined width for which automatic restoration was conventionally difficult, the control mechanism converges this swing, thus enabling automatic restoration of the overhead transport vehicle 1.

The control mechanism for converging swing, which is included in the overhead transport vehicle 1, will be described with reference to FIGS. 2 to 5. In drawings following FIG. 2, each configuration of the transport vehicle body 10 including the elevating drive unit 6, the belt B, and the holding unit 7 is schematically illustrated. As illustrated in FIG. 2, the overhead transport vehicle 1 includes the detection unit 67 to detect swing of the holding unit 7. The detection unit 67 is attached to, for example, the elevating drive unit 6. The detection unit 67 has, for example, a light projection part and a light receiving part, and these light projection part and light receiving part expose downwards. On the other hand, a reflective plate 77 is attached on the top surface of the holding unit 7. On the basis of a state in which the holding unit 7 hangs straightly (that is, a state in which the belt B extends in a vertical direction), the detection unit 67 emits light downwards and detects reflected light that is reflected by the reflective plate 77, whereby the swing of the holding unit 7 can be detected. The detection unit 67 can judge whether the swing of the holding unit 7 is larger or smaller than a certain type of threshold (e.g. a predetermined width in the description) by judging whether reflected light that is reflected by the reflective plate 77 is detected or not. The detection unit 67 may have a configuration capable of comparing and determining whether the swing is larger or smaller than several types of thresholds to be described later (a predetermined width, convergence width or tolerance). The detection unit 67 is required, at least, to have a configuration capable of comparing and determining whether the swing is larger or smaller than a predetermined width to be described later.

The swing detected by the detection unit 67 may be, for example, a swing in a direction (+X direction or −X direction illustrated in drawings) corresponding to a traveling direction of the overhead transport vehicle 1. Alternatively, the swing detected by the detection unit 67 may be a swing in a horizontal and a lateral direction (+Y direction or −Y direction illustrated in drawings) orthogonal to a traveling direction. In addition, the swing detected by the detection unit 67 may be a swing in any direction within XY plane in which these various directions are synthesized. The swing detected by the detection unit 67 is detected, for example, as an amplitude in any one of plus (+) and minus (−).

As illustrated in FIG. 2, the controller 8 includes a position acquisition unit 81, a swing acquisition unit 82, a determination unit 83, and a motor control unit 84. The controller 8 includes these functional elements to perform raising/lowering control (described later) of the holding unit 7. The functional elements of the controller 8 are realized by reading a program onto a processor or a main storage unit and executing it.

Figure 3:
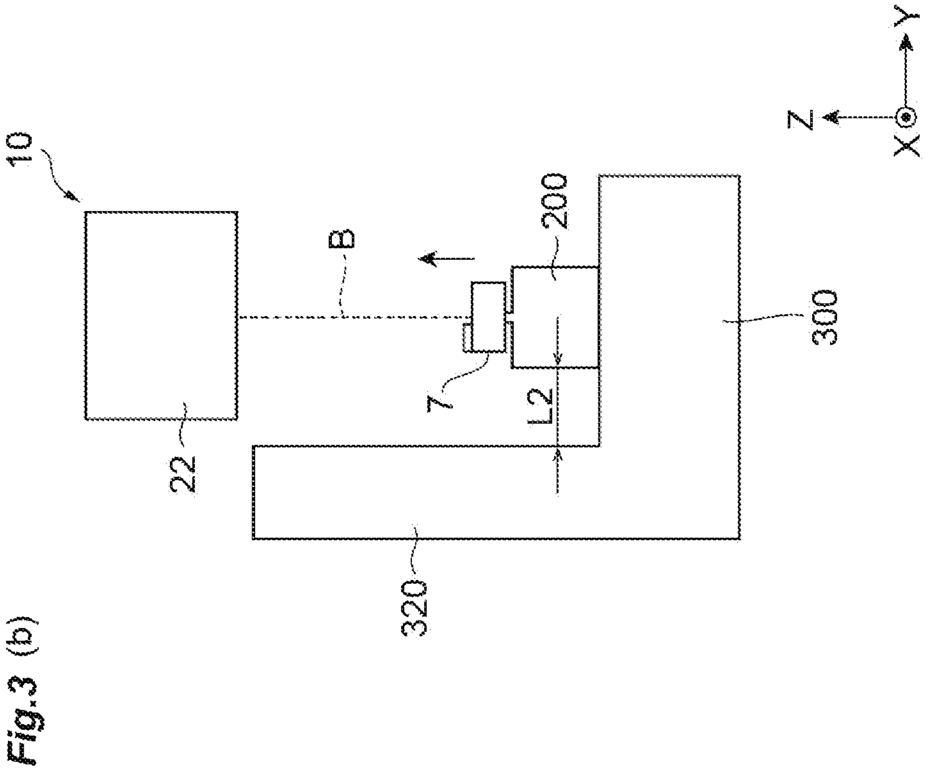
FIG. 3(*a*) is a view illustrating a shortest distance in a traveling direction with respect to a wall part of a device and FIG. 3(*b*) is a view illustrating a shortest distance in a lateral direction with respect to the wall part of the device.
Figure 3:
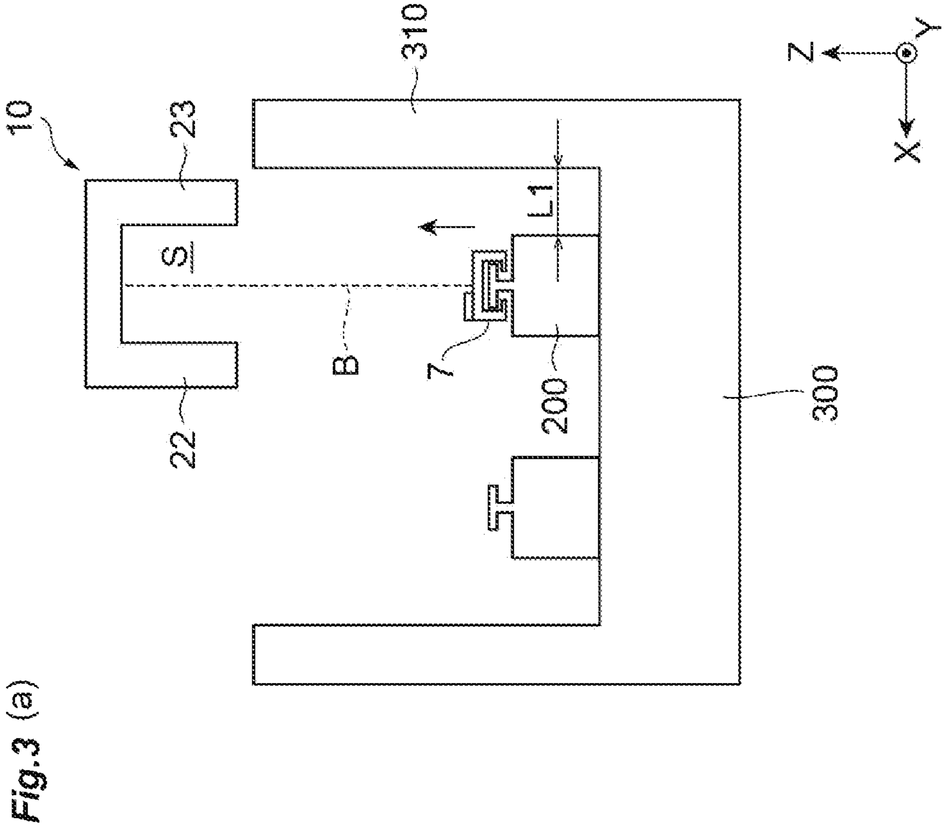

The controller 8 stores a threshold used for the raising/lowering control (described later). The controller 8 stores a predetermined width as a first threshold relating to swing. The predetermined width may be set, for example, from the viewpoint that the FOUP 200 is prevented from coming into contract with an obstacle such as wall part of device side when the FOUP 200 placed on the load port 300 is trying to be gripped and pulled up by the holding unit 7. For example, as illustrated in FIG. 3(*a*), the shortest distance between the FOUP 200 and wall part 310 of device in a traveling direction (X-direction) is a first distance L1. As illustrated in FIG. 3(*b*), the shortest distance between the FOUP 200 and wall part 320 of device in a lateral direction (Y-direction) is a second distance L2. In such a situation, the predetermined width may be set to be any one of the first distance L1 and the second distance L2. The predetermined width may be set to be the smallest value in these distance values. The predetermined width may be set based on tolerance (physical tolerance) of position change of FOUP 200 with respect to an apparatus (such as semiconductor device production apparatus) to which the overhead transport vehicle 1 is applied. The predetermined width may be set based on tolerance in any direction of a traveling direction and a lateral direction or may be set based on tolerance in different direction from these directions. This predetermined width is used for a first swing convergence control (first swing waiting control) in the raising/lowering control.

The controller 8 may store, for example, a convergence width as a second threshold related to the swing. The convergence width may be set from the viewpoint that, for example, the holding unit 7 (or the FOUP 200) is prevented from coming into contact with each part of the transport vehicle body 10 when the holding unit 7 is trying to be stored into the transport vehicle body 10.

Figure 4A:
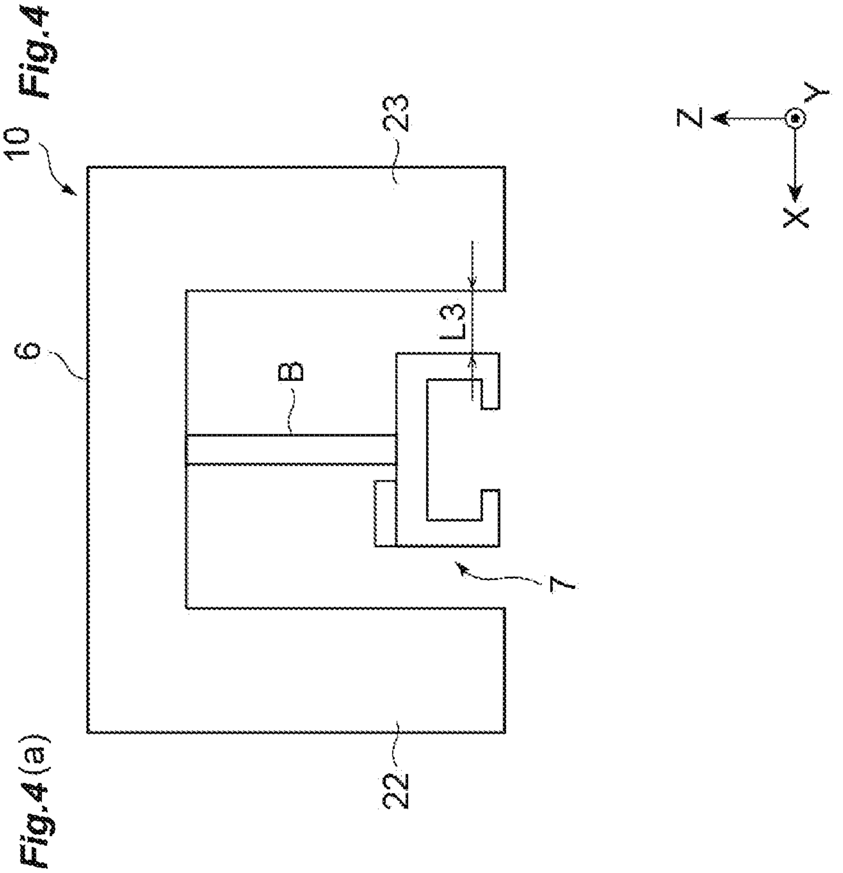
FIG. 4(*a*) is a view illustrating a concept of tolerance in a traveling direction and FIG. 4(*b*) is a view illustrating a concept of tolerance in a lateral direction.
Figure 4B:
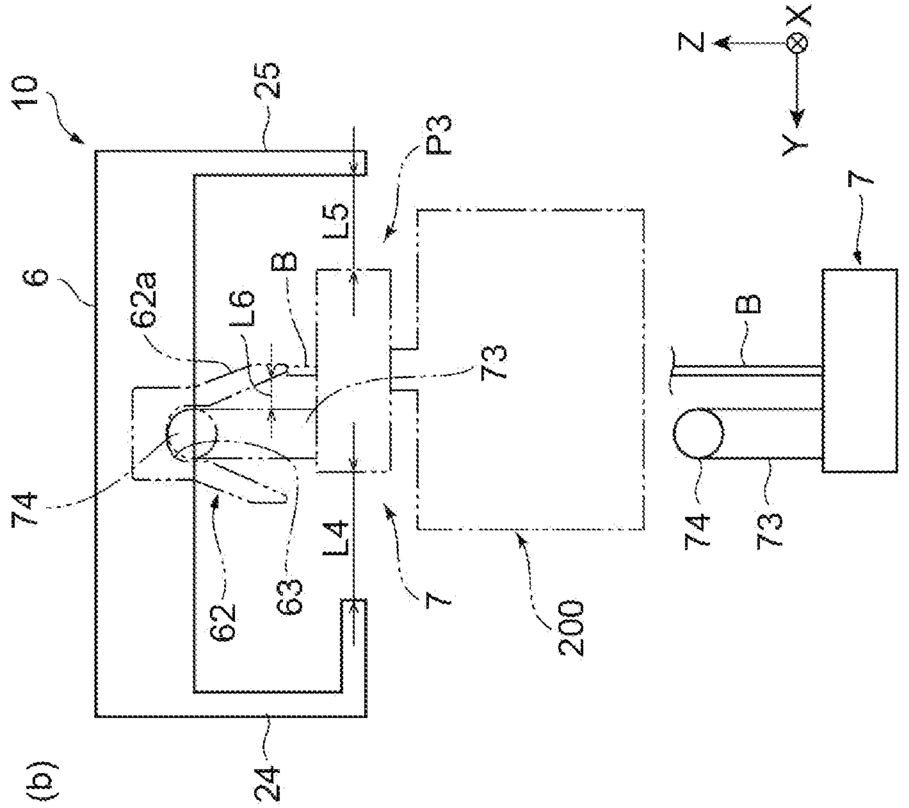

For example, as illustrated in FIG. 4(*a*), the shortest distance between the holding unit 7 and the rear frame 23 of the transport vehicle body 10 in a traveling direction (X-direction) is a third distance L3. As illustrated in FIG. 4(*b*), the shortest distance between the holding unit 7 and the cover 24 of the transport vehicle body 10 in a lateral direction (Y-direction) is a fourth distance L4, and the shortest distance between the holding unit 7 and the cover 25 of the transport vehicle body 10 in a lateral direction (Y-direction) is a fifth distance L5. The transport vehicle body 10 may have a positioning member 62 to position the holding unit 7 to be stored into the transport vehicle body 10. The positioning member 62 includes a taper portion 62*a* opening to spreading downwards and a receiving dent portion 63 which is a semi-cylindrical dent portion formed at a top end of the taper portion 62*a*. The holding unit 7 includes a standing portion 73 erected on a top surface of the holding unit 7 and protruding upwards, and a cylindrical portion 74 attached to a top end of the standing portion 73. When the holding unit 7 is stored at a regular position in the transport vehicle body 10, that is, in a state in which there is no swing (zero (0) swing), the standing portion 73 and the cylindrical portion 74 are inserted to the center of the positioning member 62 from below, and the cylindrical portion 74 fits in the receiving dent portion 63. Even when the holding unit 7 approaches the transport vehicle body 10 with a slight swing as long as the cylindrical portion 74 is placed within the range of the taper portion 62*a* of the positioning member 62, the cylindrical portion 74 is guided by the taper portion 62*a* and, finally, fits in the receiving dent portion 63. In a fitting state illustrated in FIG. 4(*b*), a distance between the standing portion 73 (or the cylindrical portion 74) and an opening end (bottom end) of the taper portion 62*a* in a lateral direction (Y-direction) is a sixth distance L6.

In such a situation, the convergence width may be set to be any one of the third distance L3, the fourth distance L4, the fifth distance L5, and the sixth distance L6. The convergence width may be set to be the smallest value among these distance values. The convergence width may be set based on tolerance (physical tolerance) of position change of the holding unit 7 with respect to the transport vehicle body 10. The convergence width may be set based on the swing tolerance of the holding unit 7 and/or the FOUP 200 permitted when the holding unit 7 is stored into the transport vehicle body 10 in any one direction of a traveling direction and a lateral direction of the overhead transport vehicle 1. This convergence width is not used for control in this example, however, as a modification, may be used for a second swing convergence control (second swing waiting control).

The height determined when the cylindrical portion 74 fits in the receiving dent portion 63 and a positioning of the holding unit 7 is completed, is an upward end of the holding unit 7 and a storage position P3 of the holding unit 7.

As described above, in the relationship between the transport vehicle body 10 and the holding unit 7 or the relationship between the transport vehicle body 10 and the FOUP 200 (gripped by the holding unit 7), a swing tolerance of the holding unit 7 and/or the FOUP 200 permitted when the holding unit 7 is stored into the transport vehicle body 10 is physically determined. The convergence width may be set to be larger than the tolerance. Further, the predetermined width may be set to be larger than the tolerance. The predetermined width used for the first swing convergence control is set to be larger than the convergence width. In this description, "swing is converged" means that the swing is equal to or less than the convergence width. Also, it may mean that the swing is practically zero (0).

Figure 5:
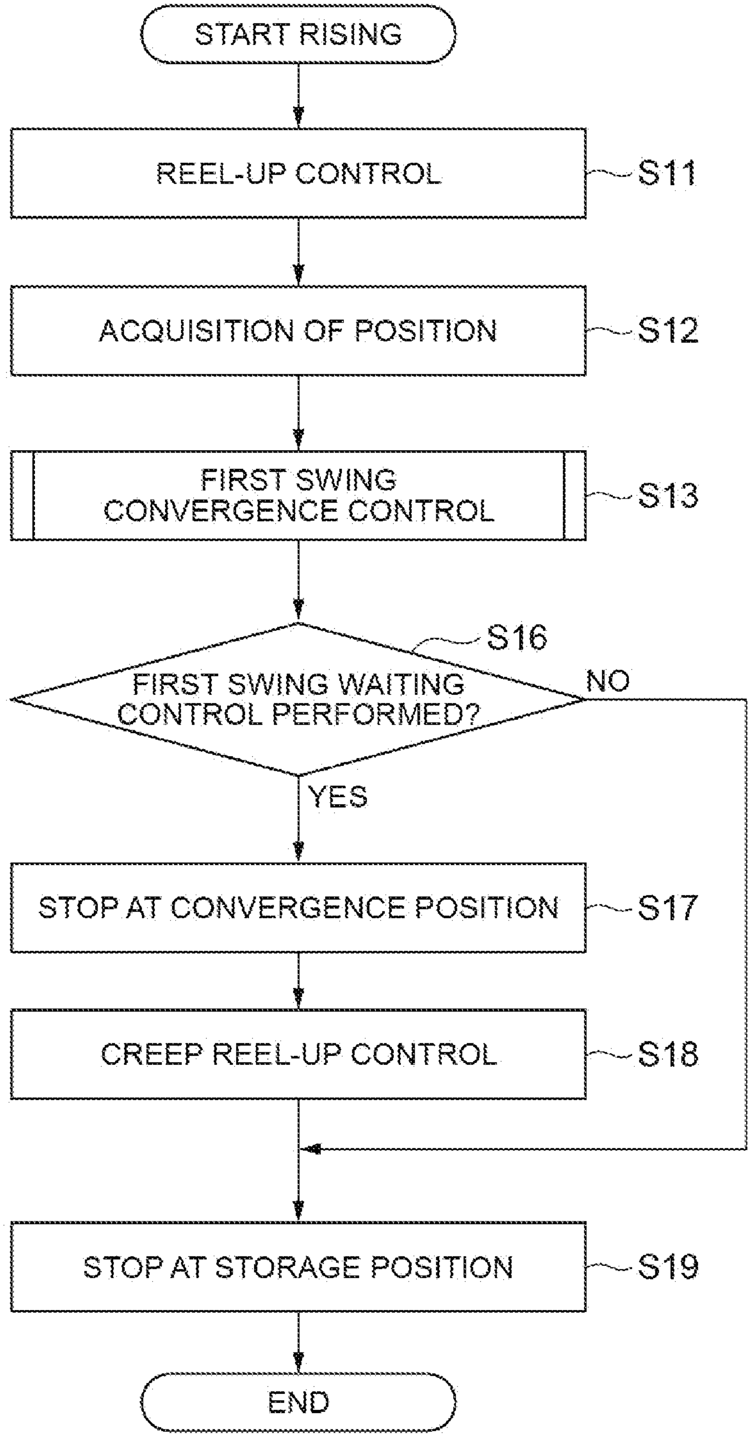
FIG. 5 is a flowchart of processing performed by a controller in reel-up control.

Next, control (processing) performed by the controller 8, that is, a method of controlling raising/lowering of the holding unit will be described. With reference to FIGS. 5 to 8(*b*), reel-up control will now be described. FIG. 5 is a flowchart of processing performed by the controller 8 in the reel-up control. In a state in which the holding unit 7 has descended to a position that allows the holding unit 7 to grip the FOUP 200, the controller 8 controls the holding unit 7 to cause the grippers 72 to grip the FOUP 200. The controller 8 controls the elevating motor 61 to reel up the belt B (step 11). Whereby, the holding unit 7 and the FOUP 200 start rising.

In explanation of the raising/lowering control performed by the controller 8, a concept, "a position" of the holding unit 7 such as the standby position, the convergence position, and the storage position, is used. The "position" is a concept corresponding to a height of the holding unit 7. In the controller 8, "a position" corresponds to, for example, a reel-out amount of the belt B. "The reel-out amount is long" means that "a position" is low, that is, the holding unit 7 is close to the load port 300. "The reel-out amount is short" means that "a position" is high, that is, the holding unit 7 is close to the transport vehicle body 10. Hereinafter, a position of the holding unit 7 may be referred to as a/the "raising and lowering position".

Figure 7:
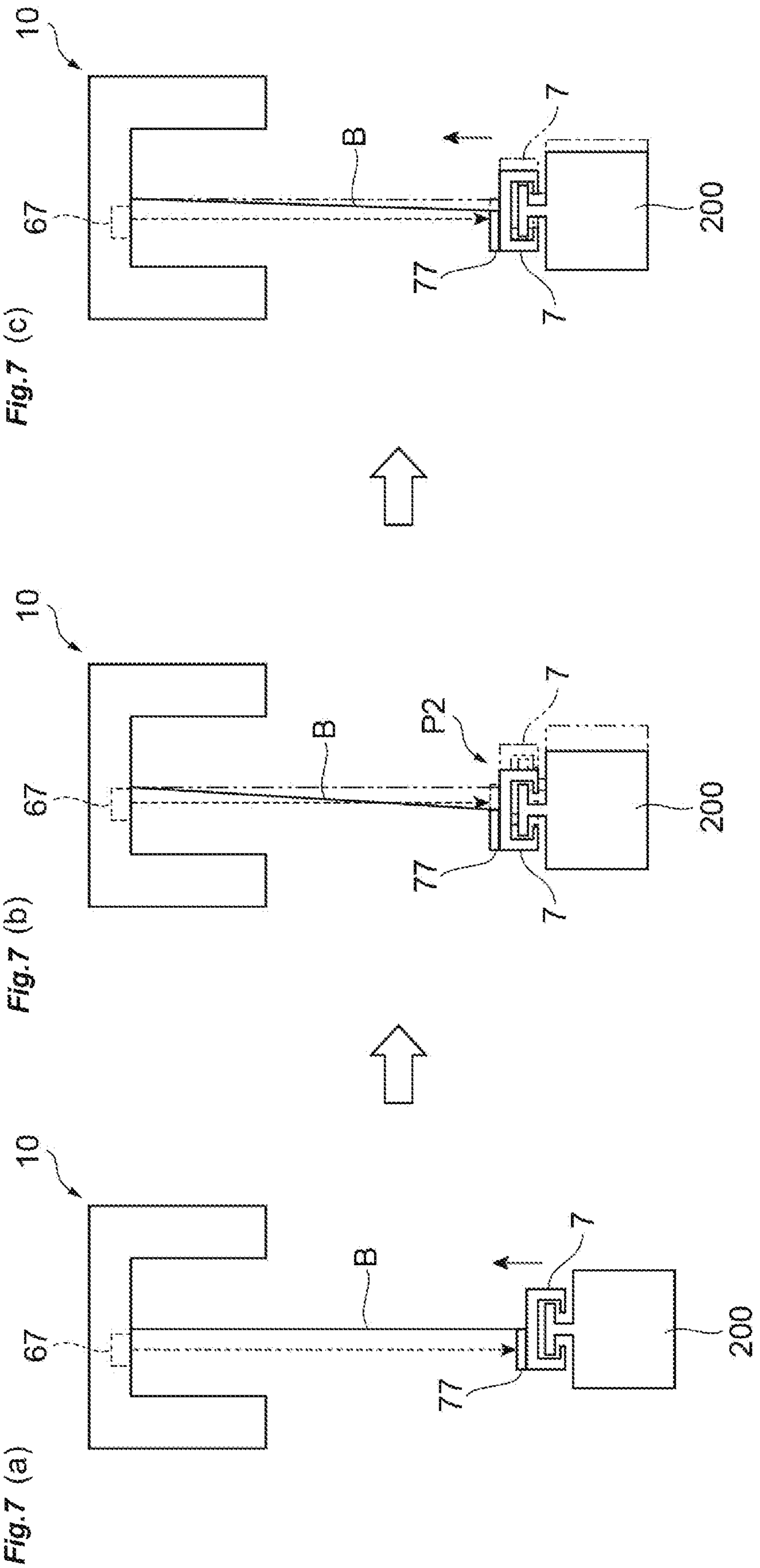
FIG. 7(*a*) to FIG. 7(*c*) are views illustrating the first swing waiting control (swing convergence control in a standby position) in reel-up control.
Figure 8:
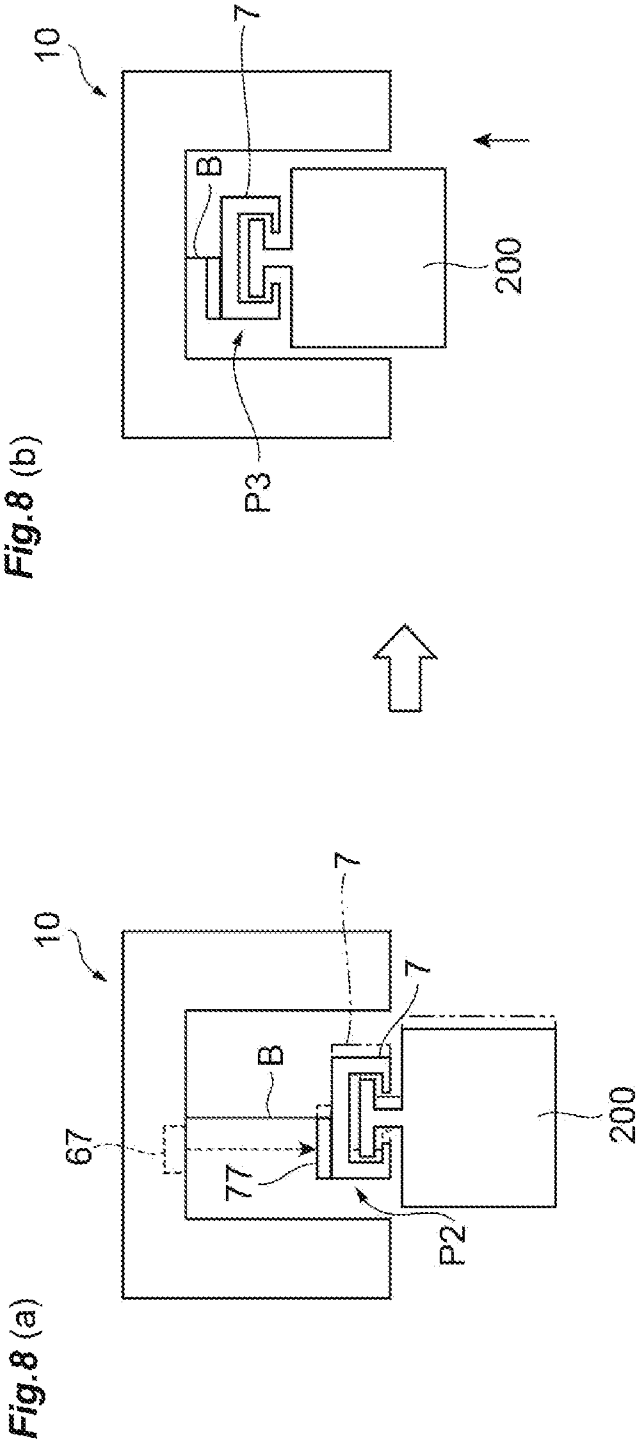
FIG. 8(*a*) and FIG. 8(*b*) are views illustrating a second swing waiting control (swing convergence control in a convergence position) in reel-up control.

As illustrated in FIG. 7(*a*), the belt B is reeled up so that the holding unit 7 and the FOUP 200 rise. The position acquisition unit 81 of the controller 8 receives rotation-related signals from the elevating motor 61 to acquire a position of the holding unit 7 (step S12). The position is acquired by the position acquisition unit 81 per a predetermined time during the reel-up control performed by the controller 8. Subsequently, the controller 8 performs the first swing convergence control (step S13).

Figure 6:
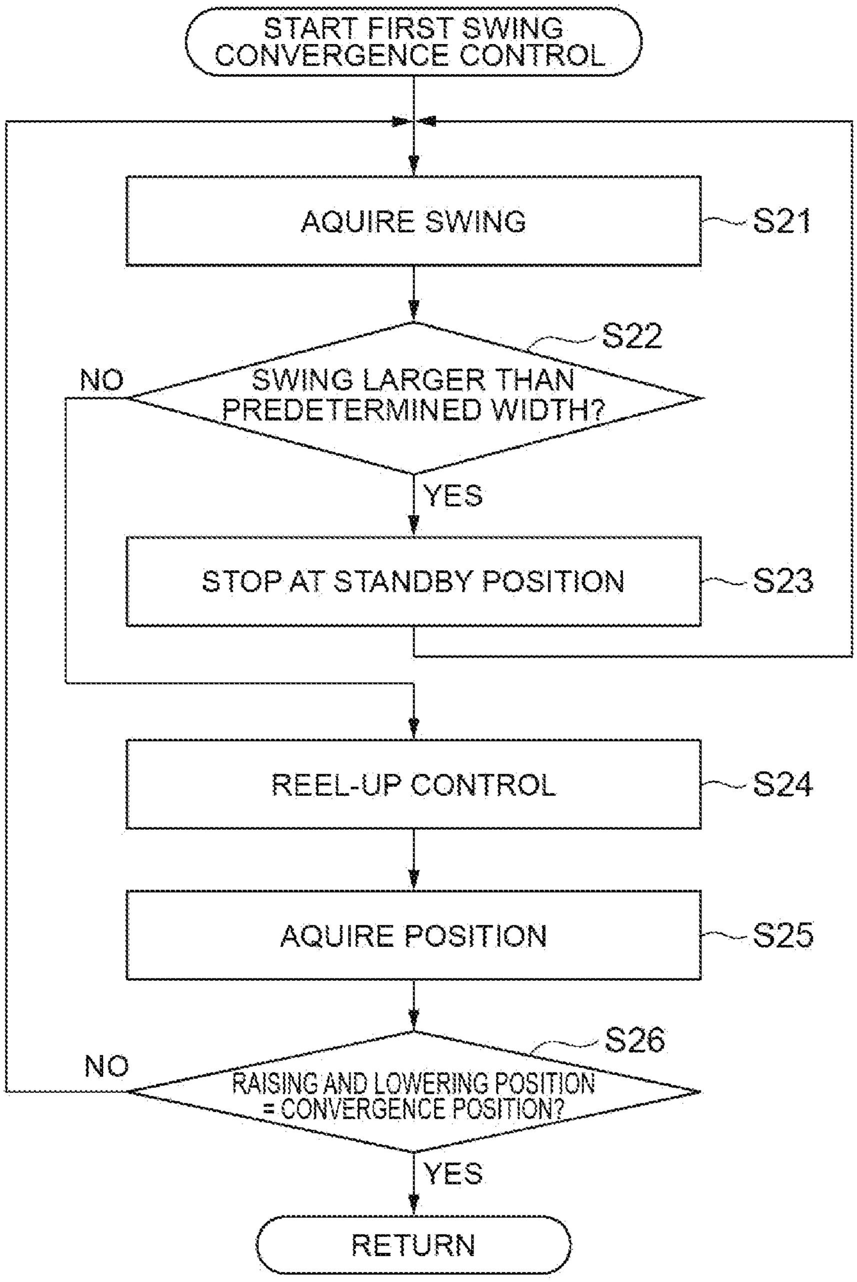
FIG. 6 is a flowchart of processing performed in a first swing convergence control in flow of FIG. 5.

With reference to FIG. 6, processing performed in the first swing convergence control will be described. In the reel-up control, the detection unit 67 detects the swing of the holding unit 7 (detection process). As illustrated in FIG. 6, the swing acquisition unit 82 of the controller 8 receives signals from the detection unit 67 that has detected the swing of the holding unit 7 and acquires the swing of the holding unit 7 (step S21). The determination unit 83 of the controller 8 determines whether the swing detected by the detection unit 67 is larger or not than a predetermined width (step S22). As illustrated in FIG. 7(*b*), for example, irradiated light from the detection unit 67 deviates from the reflective plate 77 and the swing of the holding unit 7 is large. When the swing is determined to be larger than a predetermined width (step S22; YES), the motor control unit 84 of the controller 8 controls the elevating motor 61 to stop reeling up the belt B and maintains the holding unit 7 at an arbitrary standby position P1 (step S23). Then, the controller 8 repeats processing of step S21 and determination of step S22.

In step S22, when the swing is determined to be equal to or less than the predetermined width (step S22; NO), the motor control unit 84 of the controller 8 controls the elevating motor 61 to reel up the belt B (step S24). As illustrated in FIG. 7(*c*), for example, irradiated light from the detection unit 67 consistently hits on the reflective plate 77 and the swing of the holding unit 7 subsides a bit. As just described, when the swing of the holding unit 7 subsides a bit, the controller 8 restarts reeling up the belt B. However, right after the swing becomes lower than the predetermined width, the swing may be larger than a tolerance to be stored in the transport vehicle body 10, for example, may be more than twice as large as the tolerance or more than three times as large as the tolerance. The standby position P1 may be an arbitrary position where it is determined by the controller 8 that the swing is larger than the predetermined width. The standby position P1 may also be slightly higher position (higher position for a time-lag required for stop control) than the arbitrary position where it is determined by the controller 8 that the swing is larger than the predetermined width. The processing of step S22 to step S24 corresponds to a reel-up process in a method of controlling raising/lowering of the gripping unit.

In the first swing convergence control including step S21 to step S24, reel-up is stopped or continued based on whether the swing of the holding unit 7 is larger or not than a predetermined width regarded as a threshold. Processing of step S23 to stop reel-up corresponds to the first swing waiting control. In the first swing convergence control, when the swing of the holding unit 7 is larger than the predetermined width, the first swing waiting control is performed. Unless the swing of the holding unit 7 becomes equal to or less than the predetermined width, the first swing waiting control is repeated and the holding unit 7 is maintained at arbitrary standby position P1. That is, the first swing waiting control is performed every time it is determined the swing is larger than the predetermined width. In the first swing convergence control, the holding unit 7 is stopped and wait until the holding unit 7 and the FOUP 200 can be safely lifted up, that is, until the swing of the holding unit 7 subsides a bit. On the other hand, when it is consistently determined at step S22 that the swing of the holding unit 7 is equal to or less than the predetermined width, the belt B is reeled up without performing the first swing waiting control.

Subsequently, the position acquisition unit 81 of the controller 8 receives a rotation-related signals from the elevating motor 61, and acquires a position of the holding unit 7 (step S25). Then, the determination unit 83 of the controller 8 determines whether a raising and lowering position is a convergence position or not (step S26). Pertaining to the position of the holding unit 7, the controller 8 stores the convergence position and the storage position. A predetermined control values corresponding to each of convergence position and storage position are stored in the controller 8. Based on a position acquired by the position acquisition unit 81, the determination unit 83 of the controller 8 determines whether the position of the holding unit 7 is the convergence position or not. The motor control unit 84 of the controller 8 can stop the holding unit 7 at each position of the convergence position and the storage position by controlling the elevating motor 61.

When it is determined that the raising and lowering position is not the convergence position (step S26; NO), the controller 8 repeats processing of step S21. As just described, when swing larger than the predetermined width is detected while the holding unit 7 rises until the holding unit 7 reaches the convergence position P2, the controller 8 repeats a swing detection and the first swing waiting control while the belt B is reeled up (see FIG. 12).

Meanwhile, when it is determined at step S26 that a raising and lowering position is a convergence position (step S26; YES), processing performed by the controller 8 returns to the flow illustrated in FIG. 5, and the determination unit 83 determines whether the first swing waiting control to maintain the holding unit 7 at the standby position is performed at least once or not (step S16). When it is determined at least once that the swing is larger than the predetermined width, the first swing waiting control (step S23) is performed at least once. In that situation, it is determined that the holding unit 7 stops at the standby position (step S16; YES) and the motor control unit 84 of the controller 8 controls the elevating motor 61 to stop reeling up of the belt B for a certain period of time and maintains the holding unit 7 at the convergence position P2 (step S17, see FIG. 8(*a*)).

The convergence position P2 is between the standby position P1 and the storage position P3. The reel-out amount of the belt B of the convergence position P2 may be slightly longer than that of the storage position P3, for example. The convergence position P2 may be a position such that the FOUP 200 does not overlap with the transport vehicle body 10 in a side view.

After a certain period of time has passed since processing of step S17 started, the motor control unit 84 of the controller 8 controls the elevating motor 61 to restart reeling up the belt B and performs creep reeling up control (step S18). In the creep reel-up control, the motor control unit 84 of the controller 8 makes a second reel-up speed smaller than a first reel-up speed. The second reel-up speed is a speed when moving from the convergence position P2 to the storage position P3 in reel-up control and the first reel-up speed is a speed when moving from the standby position P1 to the convergence position P2 in reel-up control (step S11 and S24). Then, when the holding unit 7 reaches the storage position P3 which is an upward end, the motor control unit 84 of the controller 8 controls the elevating motor 61 to stop reeling up the belt B. (step S19, see FIG. 8(*b*))

In the second swing convergence control including step S16 to step S18, a reel-up is stopped for a certain period of time or the reel-up continues based on whether the first waiting control is performed or not. A process of step S17 to stop the reel-up corresponds to the second swing waiting control. In the second swing convergence control, a holding unit 7-related threshold is not used. The controller 8 ensures that the swing is smaller than the above convergence width by stopping the holding unit 7 at the storage position P2 for a certain period of time.

In step S16, when it is determined that the holding unit 7 has never stopped at the standby position (step S16; NO), the motor control unit 84 of the controller 8 controls the elevating motor 61 to stop reeling up the belt B (step S19) at the time when the holding unit 7 reaches the storage position P3 which is an upward end. As just described, when the holding unit 7 has never swung larger than the predetermined width, a normal reel-up is performed without stopping a reel-up or reducing a reel-up speed.

According to an example of control as above, when the swing exceeding the predetermined width is detected while the holding unit 7 arises, the first swing waiting control is performed at least once, and after the swing is slightly suppressed, the second swing waiting control is performed in a state in which the reel-out amount of the belt B is shorten. As a result, the time until the swing of the holding unit 7 is converged, can be reduced.

Figure 9:
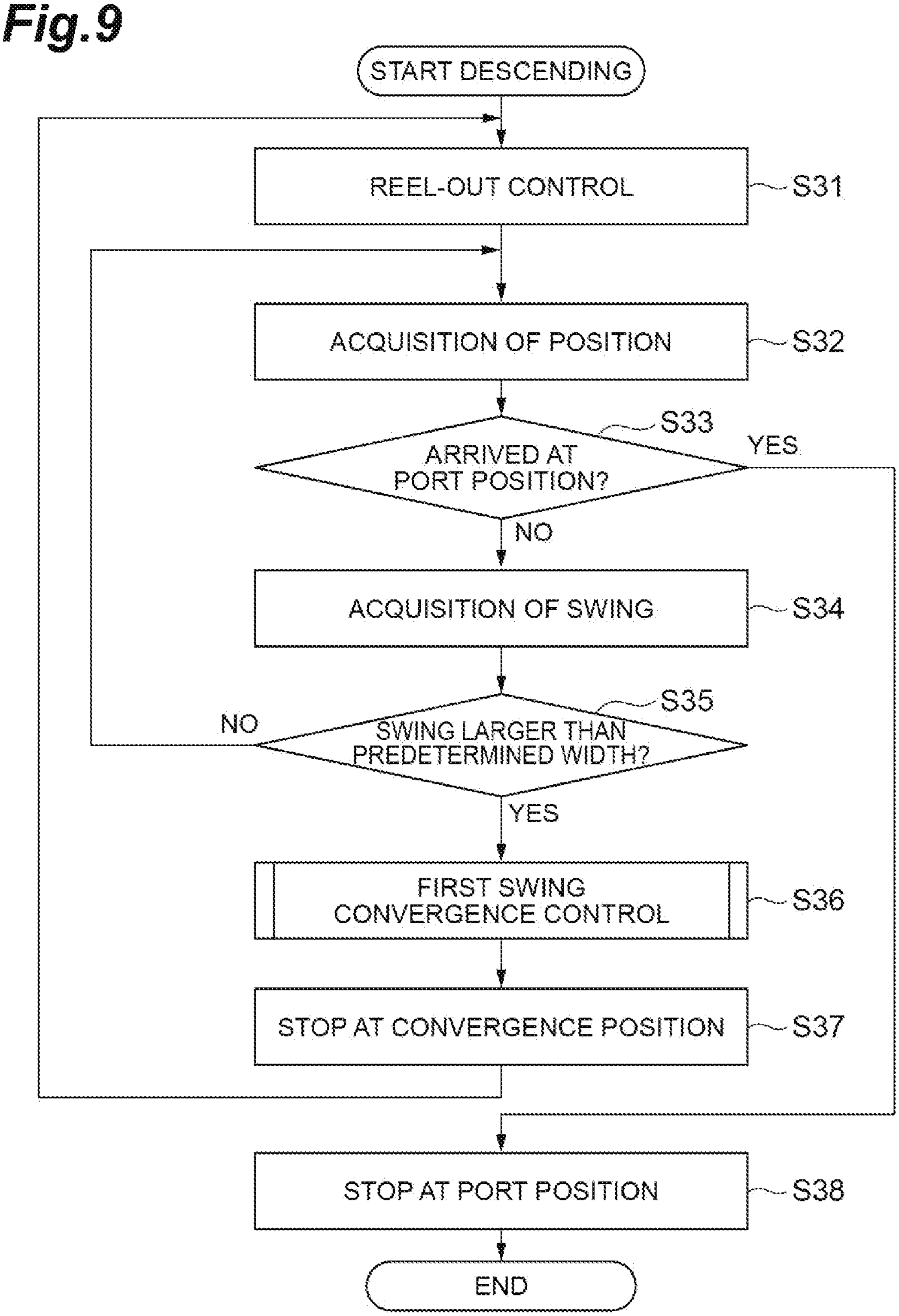
FIG. 9 is a flowchart of processing performed by a controller in reel-out control.
Figure 10:
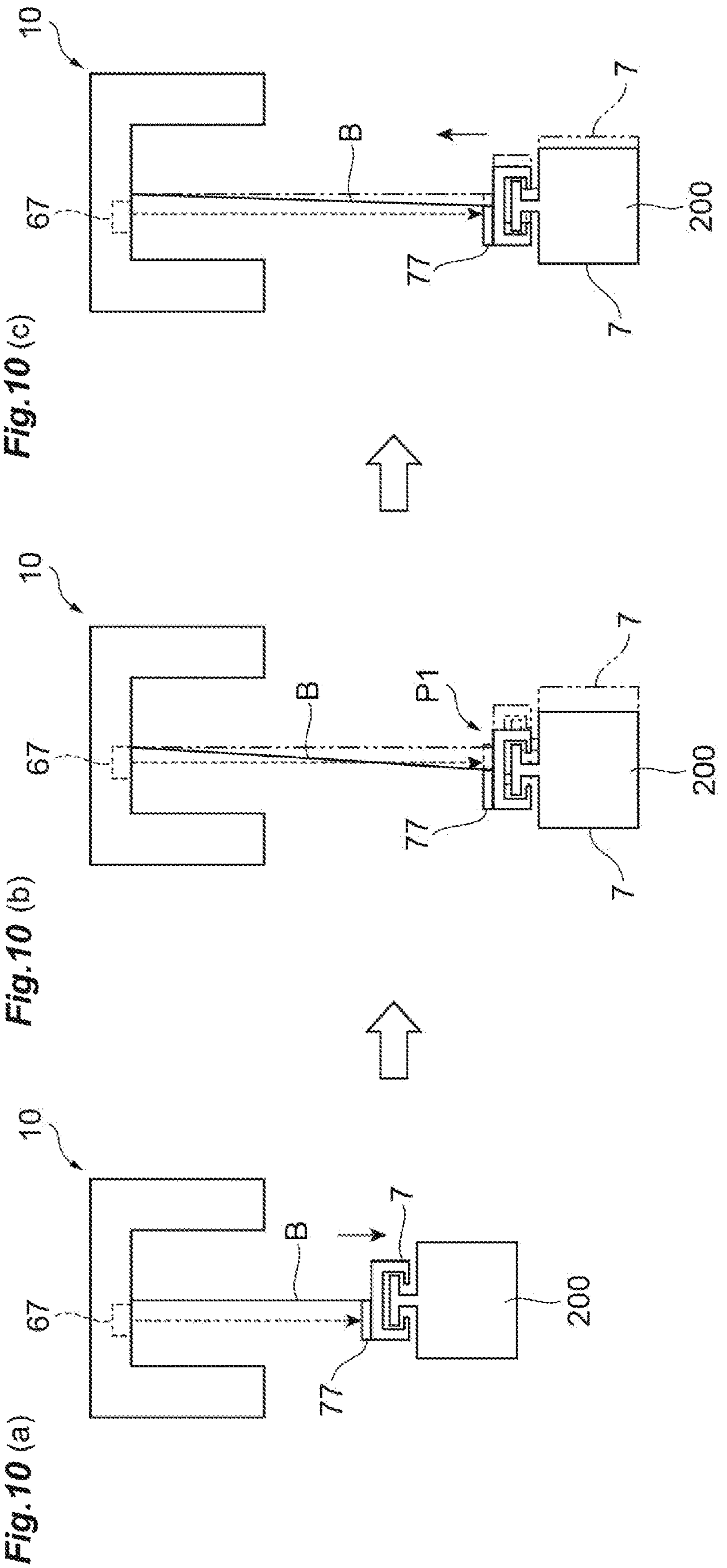
FIG. 10(*a*) to FIG. 10(*c*) are views illustrating a first swing waiting control (swing convergence control in a standby position) in reel-out control.
Figure 11:
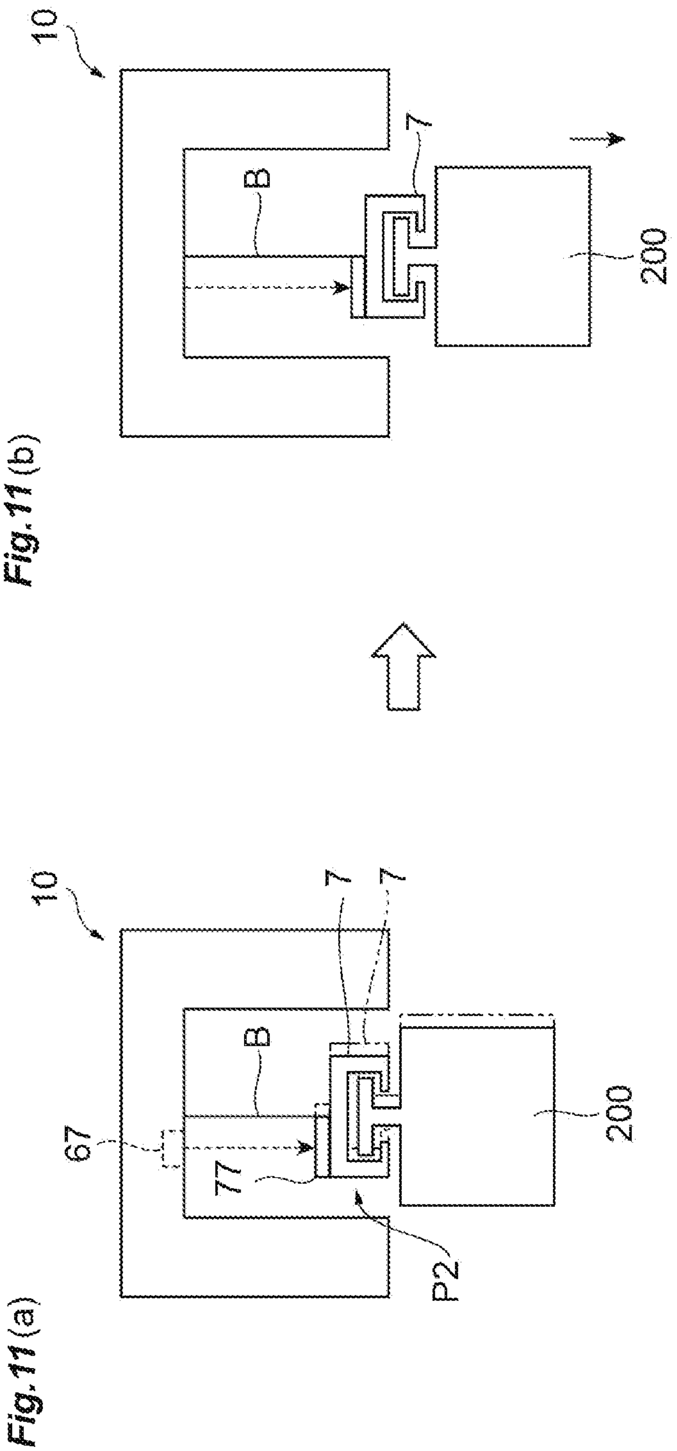
FIG. 11(*a*) and FIG. 11(*b*) are views illustrating a second swing waiting control (swing convergence control in a convergence position) in reel-out control.

Next, with reference to FIGS. 9 to 11(*b*), reel-out control will be described. FIG. 9 is a flowchart of processing performed by the controller 8 in the reel-out control. The controller 8 controls the elevating motor 61 to reel out the belt B to thereby cause the holding unit 7 gripping the FOUP 200 to descend from the storage position P3 (step S31). As illustrated in FIG. 10(*a*), the belt B is reeled out and the holding unit 7 and the FOUP200 descend. The position acquisition unit 81 of the controller 8 receives a rotation-related signals from the elevating motor 61 and acquires the position of the holding unit 7 (step S32). The position is acquired by the position acquisition unit 81 per a predetermined time during reel-out control performed by the controller 8. Subsequently, the determination unit 83 of the controller 8 determines whether the holding unit 7 has reached a port position or not (step S33). Pertaining to the position of the holding unit 7, the controller 8 stores a port position (placement position) which is a position at which the FOUP 200 is placed on the load port 300. A predetermined control value corresponding to the port position is stored by the controller 8. The determination unit 83 of the controller 8 determines whether the position of the holding unit 7 is the port position or not based on a position acquired by the position acquisition unit 81.

When it is determined that the holding unit 7 has not reached the port position (step S33; NO), the swing acquisition unit 82 of the controller 8 receives signals from the detection unit 67 that has detected swing of the holding unit 7 and acquires the swing of the holding unit 7 (step S34). Subsequently, the determination unit 83 of the controller 8 determines whether the swing detected by the detection unit 67 is larger than a predetermined width or not (step S35). When the swing is determined to be larger than the predetermined width (step S35; YES), processing by the controller 8 is changed into the first swing convergence control (step S36), and the motor control unit 84 controls the elevating motor 61 to stop reeling up the belt B and maintain the holding unit 7 at arbitrary waiting position P1 (step S23). Then, the controller 8 repeats the processing of step S21 and the determination of step S22.

The first swing convergence control of step S36 is the same as the first swing convergence control (step S21 to S26 illustrated in FIG. 6) in the reel-up control. In the reel-out control, the detection unit 67 detects swing of the holding unit 7 (detection process). When the swing is determined to be larger than the predetermined width during the reel-out control (step S22; YES), the motor control unit 84 of the controller 8 controls the elevating motor 61 to stop reeling out the belt B and maintain the holding unit 7 at the arbitrary standby position P1 (step S23, (see FIG. 10(*b*))). Then, the controller 8 repeats processing of step S21 and determination of step S22. When the swing is determined to be equal to or less than the predetermined width (step S22; NO), the motor control unit 84 of the controller 8 controls the elevating motor 61 to reel up the belt B (step S24 (see FIG. 10(*c*)). As described above, the controller 8 reels up the belt B once to shorten a reel-out amount of the belt B at the time when the swing of the holding unit 7 subsides a bit.

In the first swing convergence control including step S21 to step S24, based on whether the swing of the holding unit 7 is larger or not than a predetermined width regarded as a threshold, a reel-out is stopped at the arbitrary standby position P1 or a reel-up is started. Processing of step S23 to stop the reel-up corresponds to the first swing waiting control. In the first swing convergence control, the holding unit 7 is stopped and wait until the holding unit 7 and the FOUP 200 can be safely lifted up, that is, until the swing of the holding unit 7 subsides to some degree.

The determination unit 83 of the controller 8 determines whether the raising and lowering position is the convergence position or not (step S26). When it is determined that the raising and lowering position is not the convergence position (step 26; NO), the controller 8 repeats processing of step S21. As described above, when the swing exceeding the predetermined width is detected until the holding unit 7 reaches the convergence position P2 also while the holding unit 7 descends, the controller 8 repeats the swing detection and the first swing waiting control while reeling up the belt B. (see FIG. 12).

In step S26, when the raising and lowering position is determined to be the convergence position (step S26; YES), processing performed by the controller 8 returns to the flow illustrated in FIG. 9 and the motor control unit 84 controls the elevating motor 61 to stop reeling up the belt B for a certain period of time and maintain the holding unit 7 at the convergence position P2 (step S37, see FIG. 11(*a*)).

In the second swing convergence control including step S37, when the holding unit 7 rises to the convergence position P2, the reel-up is stopped for a certain period of time. Processing of step S37 corresponds to the second swing waiting control. In the second swing convergence control, a threshold related to the holding unit 7 is not used. The controller 8 ensures that the swing is smaller than the convergence width by stopping the holding unit 7 at the convergence position P2 for a certain period of time.

After a certain period of time has passed since processing of step S37 started, processing performed by the controller 8 returns to step S31. The motor control unit 84 of the controller 8 controls the elevating motor 61 to reel out the belt B and lowers the holding unit 7 gripping the FOUP 200 from the convergence position P2. As illustrated in FIG. 11(*b*), the holding unit 7 is lowered in a state in which swing of the holding unit 7 subsides well.

When it is determined that the holding unit 7 has reached a port position at step S33 (step S33; YES), the motor unit 84 of the controller 8 controls the elevating motor 61 to stop reeling out the belt B (step S38).

On the other hand, when it is determined that the swing is equal to or less than the predetermined width at step S35 (step S35; NO), the controller 8 repeats processing of step S32 and determination of step S33. When it is determined that the holding unit 7 has reached a port position at step S33 (step S33; YES), the motor unit 84 of the controller 8 controls the elevating motor 61 to stop reeling out the belt B (step S38). As described above, when the swing of the holding unit 7 is consistently determined to be equal to or less than the predetermined width at step S35 while the holding unit 7 descends, no first swing waiting control is performed and the belt B is reeled out. When the holding unit 7 has never swung larger than the predetermined width, normal reel-up is performed without performing any control to stop the reel-out or to stop the reel-up in a state in which the belt B is reeled up to shorten the reel-out amount.

According to an example of control as above, when the swing of the holding unit 7 exceeding the predetermined width is detected while the holding unit 7 descends, the first swing waiting control is performed at least once, and the second swing waiting control is performed in a state in which reel-out amount of the belt B is shorten after the swing slightly subsides. As a result, the time until the swing of the holding unit 7 converges can be reduced.

According to the overhead transport vehicle 1 and a method of controlling raising/lowering of the gripping unit 7 in this example, the controller 8 controls the elevating motor 61 to reel out or reel up the belt B so that the holding unit 7 descends or rises. Since the holding unit 7 descends or rises in a state of being suspended by the belt B, swing can occur. This “swing” means that the belt B swings in any direction to form an angle based on a state in which the belt B extends in a vertical direction. In this overhead transport vehicle, when the swing of the holding unit 7 exceeds a predetermined width, the controller 8 stops reeling up the belt B and maintains the holding unit 7 at the standby position P1 lower than the storage position P3. Then, when the swing of the holding unit 7 becomes equal to or lesser than the predetermined width, the controller 8 reels up the belt B. As described above, the holding unit 7 is maintained at the standby position P1 until the swing of the holding unit 7 becomes equal to or less than the predetermined width, and when the swing becomes equal to or less than the predetermined width, the reel-up restarts. Therefore, even when the swing of the holding unit 7 occurs, operations of the overhead transport vehicle including raising/lowering of the holding unit 7 can be automatically restored.

Figure 12:
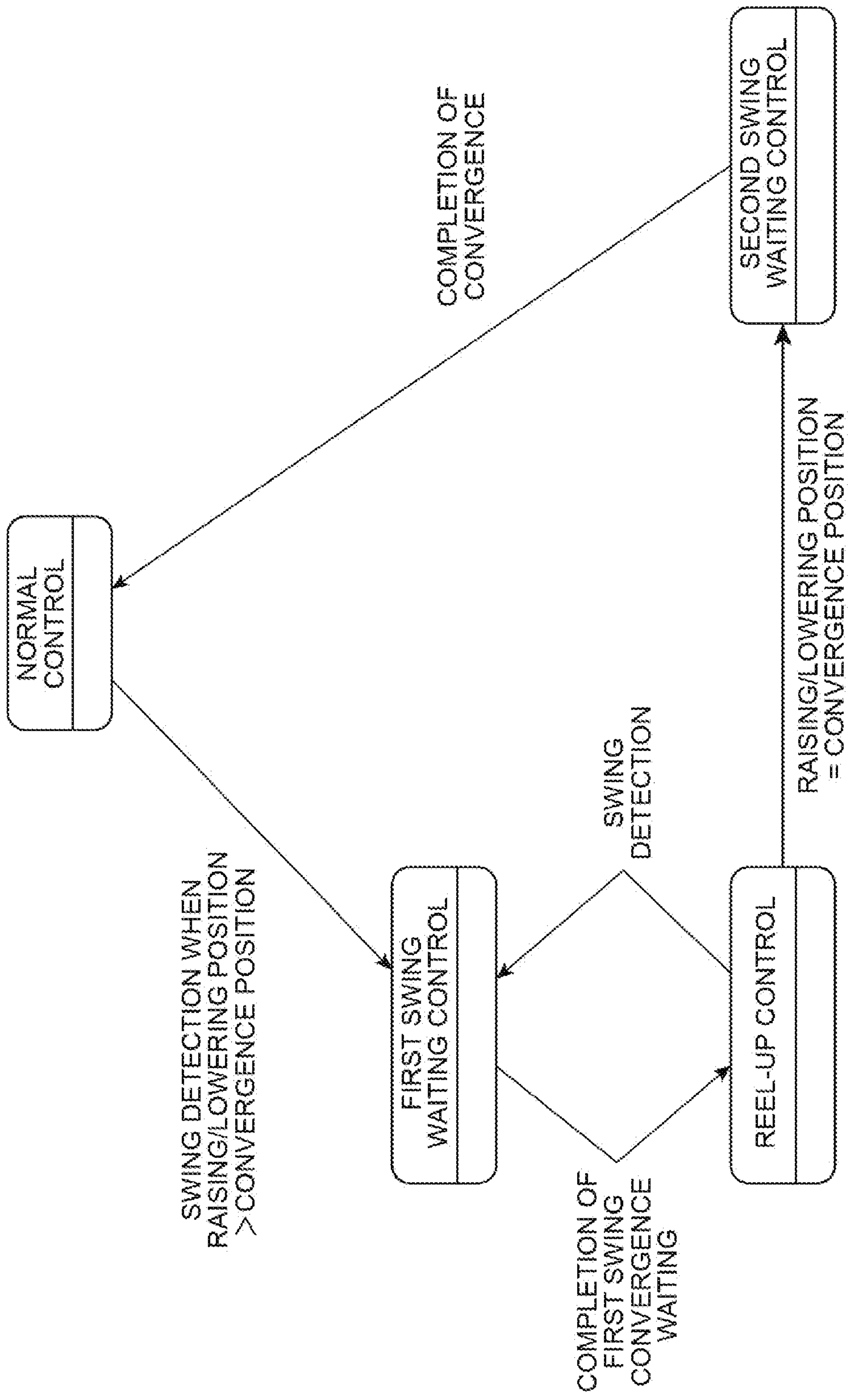
FIG. 12 is a state change diagram illustrating swing convergence control and automatic restoration in an overhead transport vehicle.

As illustrated in a state change diagram of FIG. 12, according to the overhead transport vehicle 1 and a method of controlling raising/lowering of the gripping unit 7 in this example, a state changes from a normal raising and lowering control to the first swing waiting control at the standby position P1 when a large swing (“swing” illustrated in drawings) is detected, and further reel-up of belt B, the second swing waiting control at the convergence position P2 and then, the normal raising and lowering control. A series of these controls enables a promptly automatic restoration.

A predetermined width, which is a judgement standard for whether the holding unit 7 is maintained or not at the standby position P1 is set to be larger than a tolerance of the swing when the holding unit 7 is stored. This control causes the holding unit 7 to wait at the standby position P1 until a relatively large swing slightly subsides, and when the swing subsides within the predetermined width, the reel-up is restarted. The restart of reel-up shortens length (reel-out amount) of the belt B. The swing can be suppressed more quickly as a whole by restarting the reel-up promptly than by waiting at the standby position P1 until the swing approaches the tolerance or the swing reaches the tolerance.

In reel-up control to reel up the belt B, when the first swing waiting control to maintain the holding unit 7 at the standby position P1 is performed at least once, the controller stops reeling up the belt B for a certain period of time when the holding unit 7 reaches the convergence position P2 and performs the second swing waiting control to maintain the holding unit 7 at the convergence position P2. The second swing waiting control is performed at the convergence position P2 by the controller 8 so that the swing can surely subside before the holding unit 7 is stored into the transport vehicle body 10.

A second reel-up speed in reel-up control to move from the convergence position P2 to the storage position P3 is slower than a first reel-up speed in the reel-up control to move to the convergence position P2. Taking a lot of time to reel up from the convergence position P2 to the storage position P3 can make remaining swing smaller effectively.

The swing of the holding unit 7 is detected by the detection unit in a reel-out control in which the controller 8 controls the elevating motor 61 to reel out the belt B. When the swing of the holding unit 7 exceeds the predetermined width, the controller 8 stops the reel-out of the belt B and then, when the swing of the holding unit 7 is equal to or less than the predetermined width, the controller 8 reels up the belt B to maintain the holding unit 7 at the convergence position P2 lower than the storage position P3. The swing can be converged more quickly as a whole by this control than by waiting for a convergence of the swing at a position where a swing exceeding the predetermined width is first detected.

Selected examples have been described above. However, our vehicles, systems and methods are not limited to the examples. For example, in the reel-up control illustrated in FIG. 5, the swing acquisition unit 82 of the controller 8 may acquire the swing of the holding unit 7 at the convergence position in a state in which the motor control 84 of the controller 8 causes the holding unit 7 to stop at the convergence position P2 (step S17). Subsequently, the determination unit 83 of the controller 8 may determine whether the swing detected by the detection unit 67 is larger than the convergence width or not. When the swing is determined to be larger than the predetermined width, the controller 8 may repeatedly acquire the swing at the convergence position, compare the swing and convergence width, and make a determination. When the swing is determined to be equal to or less than the convergence width, the motor control unit 84 of the controller 8 controls the elevating motor 61 to reel up the belt B. When the holding unit 7 reaches the storage position P3 which is an upward end, the motor control 84 of the controller 8 controls the elevating motor 61 to stop reeling up the belt B.

According to this control, the holding unit 7 is maintained at the convergence position P2 until the swing becomes equal to or less than the convergence width. A two-step swing convergence control (swing waiting control) at the standby position P1 and the convergence position P2 enables the holding unit 7 to rise to the storage position P3 safely and promptly. Since the convergence width is set based on the tolerance of the swing when the holding unit 7 is stored in any direction of a traveling direction or a lateral direction, the second step swing convergence control is surely and promptly performed.

Step S17 illustrated in FIG. 5 may be omitted. That is, the swing of the holding unit 7, which is located at the convergence position P2, is determined without stopping reeling up the belt B. In accordance with the determination result, it may be controlled whether reel-up of the belt B is stopped or not. In that example, when the swing is determined to be larger than the predetermined width, the controller 8 stops reeling up the belt B. When the swing is determined to be equal to or less than the convergence width, the controller 8 continues to reel up the belt B.

In reel-out control illustrated in FIG. 9, as with the above modification of reel-up control, the controller 8 may acquire the swing, make a comparison of the swing and convergence width, and make a determination while the holding unit 7 stops at the convergence position P2 (step S37).

The aspect in which the holding unit 7 grips the FOUP 200 is not limited to the examples. The reflective plate 77 may be omitted and a part of the holding unit 7 may play the same role as the reflective plate 77. The detection unit is not limited to a light projecting/receiving type of detection unit. The detection unit may be a type of detection unit to detect the swing of the holding unit 7, for example, by imaging the holding unit 7 with a camera and processing the image.

The detection unit 67 may be able to detect the size of the swing (swing width) of the holding unit 7 based on the above state. For example, in a state in which the belt B extends in a vertical direction, the swing of the holding unit 7 is zero (0). Based on this state, the detection unit 67 may be able to detect a width (maximum amplitude when detected) when the holding unit 7 swings in any horizontal direction. To detect a swing as a numerical value or to compare with several kinds of thresholds, the holding unit 7 needs to be imaged by a camera, or a plurality of sets of detection units and reflective plates need to be installed.

Swing detected by the detection unit or swing acquired (or may be calculated) by a controller is not always based on a state in which the belt B extends in a vertical direction. For example, when the overhead transport vehicle 1 travels with a predetermined acceleration, the swing may be defined based on a predetermined posture presented by the belt B and the holding unit 7. For example, a state in which the belt B forms a small angle with respect to a vertical direction at front or rear of a traveling direction may become a standard. A convergence width may be set to be a value the same as the above physical tolerance.

The suspension unit is not limited to the belt B. The suspension unit may be a linear member such as a wire. The gripping unit may have a configuration different from the holding unit 7. The gripping unit may have another configuration capable of gripping a part of an article.

An article is not limited to the FOUP 200. The article may be SMIF (Standard Mechanical Interface) Pod, FOSB (Front Opening Shipping Box) or the like.

The invention claimed is:

1. An overhead transport vehicle comprising:

a gripper that grips an article;

a suspender that suspends the gripper;

a driver configured to lower the gripper by reeling out the suspender and raise the gripper by reeling up the suspender;

a transport vehicle body to which the suspender and the driver are attached;

a detector that detects a swing of the gripper; and a controller that controls the driver to reel up the suspender and store the gripper into the transport vehicle body, wherein, in a reel-up control to reel up the suspender, when the swing of the gripper detected by the detector exceeds a predetermined width, the controller stops reeling up the suspender, maintains the gripper at a standby position lower than a storage position at which the gripper is stored into the transport vehicle body and then, when the swing of the gripper becomes equal to or less than the predetermined width, the controller reels up the suspender;

wherein, in the reel-up control to reel up the suspender, when a first swing waiting control to maintain the gripper at the standby position is performed at least once, the controller stops reeling up the suspender for a selected period of time at the time when the gripper reaches a convergence position between the standby position and the storage position and performs a second swing waiting control to maintain the gripper at the convergence position.

2. The overhead transport vehicle according to claim 1, wherein the predetermined width is set to be larger than a permissible value of the swing of the gripper and/or the article permitted when the gripper is stored into the transport vehicle body.

3. The overhead transport vehicle according to claim 1, wherein a second reel-up speed during the reel-up control from the convergence position to the storage position is slower than a first reel-up speed during the reel-up control to the convergence position.

4. An overhead transport vehicle comprising:

a gripper that grips an article;

a suspender that suspends the gripper;

a driver configured to lower the gripper by reeling out the suspender and raise the gripper by reeling up the suspender;

a transport vehicle body to which the suspender and the driver are attached;

a detector that detects a swing of the gripper; and a controller that controls the driver to reel up the suspender and store the gripper into the transport vehicle body, wherein, in a reel-up control to reel up the suspender, when the swing of the gripper detected by the detector exceeds a predetermined width, the controller stops reeling up the suspender, maintains the gripper at a standby position lower than a storage position at which the gripper is stored into the transport vehicle body and then, when the swing of the gripper becomes equal to or less than the predetermined width, the controller reels up the suspender;

wherein, in the reel-out control to reel out the suspender, when the swing of the gripper detected by the detector exceeds the predetermined width, the controller stops a reel-out of the suspender, and then, when the swing of the gripper becomes equal to or less than the predetermined width, the controller reels up the suspender and maintains the gripper at a convergence position lower than the storage position.

5. A method of controlling a raising/lowering of a gripper in an overhead transport vehicle including the gripper that grips an article, a suspender that suspends the gripper, a driver configured to lower the gripper by reeling out the suspender and raise the gripper by reeling up the suspender, a transport vehicle body to which the suspender and the driver are attached, and a detector that detects swing of the gripper, in a reel-up control to reel up the suspender, the method of controlling raising/lowering of the gripper comprises:

detecting a swing of the gripper by the detector; and reeling up the suspender, the reeling up including stopping reeling up the suspender, maintaining the gripper at a standby position lower than a storage position at which the gripper is stored in the transport vehicle body when the swing of the gripper exceeds a predetermined width, and then reeling up the suspender when swing of the gripper becomes equal to or less than the predetermined width;

wherein, in the reel-up control to reel up the gripper, when a first swing waiting control to maintain the gripper at the standby position is performed in the reeling up at least once, a reel-up of the gripper is stopped for a certain period of time at the time when the gripper reaches a convergence position between the standby position and the storage position, and a second swing waiting control to maintain the gripper at the convergence position is performed.

* * * * *